Oct. 3, 1961 M. KOULICOVITCH 3,002,421
VISUAL AND PHOTOELECTRIC DEVICE FOR LOCATING
THE POSITION OF A MOVABLE MEMBER
Filed April 10, 1959 3 Sheets-Sheet 1

INVENTOR
MIRON KOULICOVITCH
By Irwin S. Thompson
ATTY.

Oct. 3, 1961 M. KOULICOVITCH 3,002,421
VISUAL AND PHOTOELECTRIC DEVICE FOR LOCATING
THE POSITION OF A MOVABLE MEMBER
Filed April 10, 1959 3 Sheets-Sheet 2
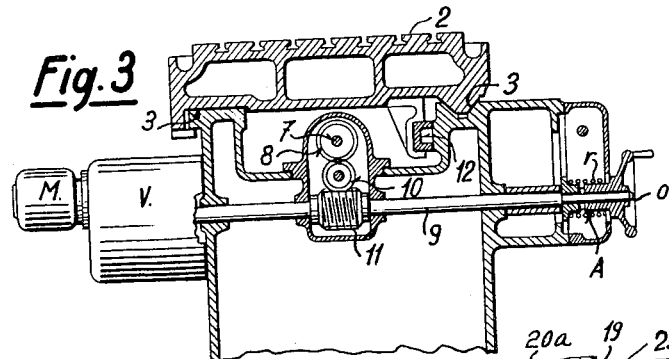
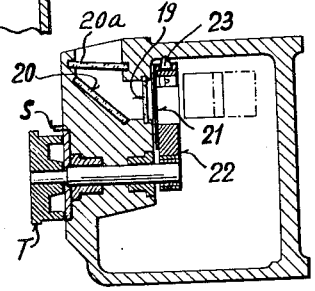
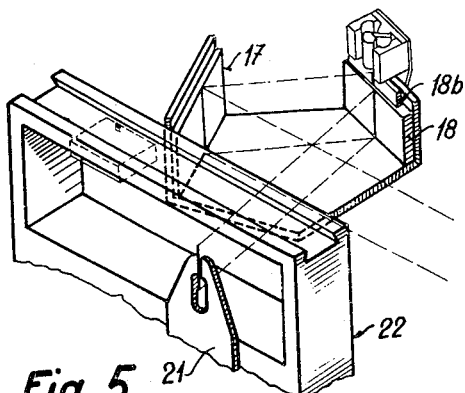
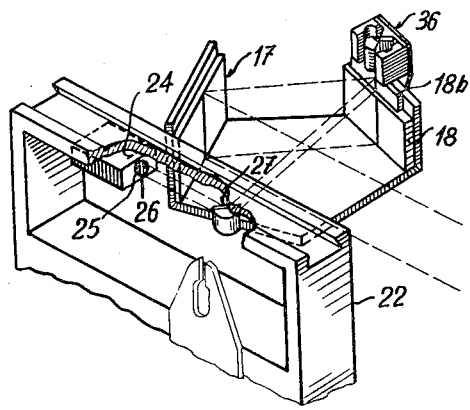
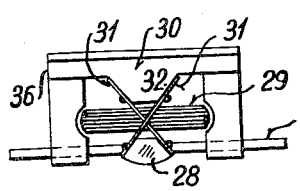
INVENTOR
MIRON KOULICOVITCH
By Irwin S. Thompson
ATTY.

United States Patent Office 3,002,421
Patented Oct. 3, 1961

---

3,002,421
VISUAL AND PHOTOELECTRIC DEVICE FOR LOCATING THE POSITION OF A MOVABLE MEMBER
Miron Koulicovitch, Geneva, Switzerland, assignor to Societe Genevoise d'Instruments de Physique, Geneva, Switzerland, a corporation of Switzerland
Filed Apr. 10, 1959, Ser. No. 805,625
Claims priority, application Switzerland Apr. 24, 1958
3 Claims. (Cl. 88—14)

There are various methods for locating the position of a movable member on a machine-tool. One of said methods consists in utilizing a device for optical observation of a precision scale carried by the movable member. Certain high precision machines provided with such an optical observation device are equipped with an automatic photo-electric locating device, which, by eliminating the personal factor, allows a very accurate locating of the position of a movable member and which, moreover, is adapted to control a control device, for example, an automatic stopping device of the movable member in a defined position.

The present invention has for its object a machine tool or a measuring machine of said type which comprises a visual and photo-electric device for locating the position of a movable member, said device comprising a precision graduated scale and a projection device projecting the image of a line of said scale, on the one hand, onto an observation screen, opposite which an adjustable mark is adapted to be displaced, and, on the other hand, onto an opaque screen provided with a slit placed before a photo-electric cell. Said machine is characterized by the fact that a mirror of the projection device is formed of two portions, one of which is fixed and projects onto the observation screen a portion of the image of a line of the scale, while the other portion of said mirror is driven in a regular oscillatory movement and projects onto the opaque screen the other portion of the image of the lie of the scale by imparting to said image a sweeping movement, the whole device being disposed in such a manner that when the image on the observation screen registers with said mark, the sweeping movement of the oscillatory portion of the image is centered onto the slit of the opaque screen.

The accompanying drawing illustrates schematically and by way of example a jig boring machine, equipped with the device according to the invention.

Figure 1:
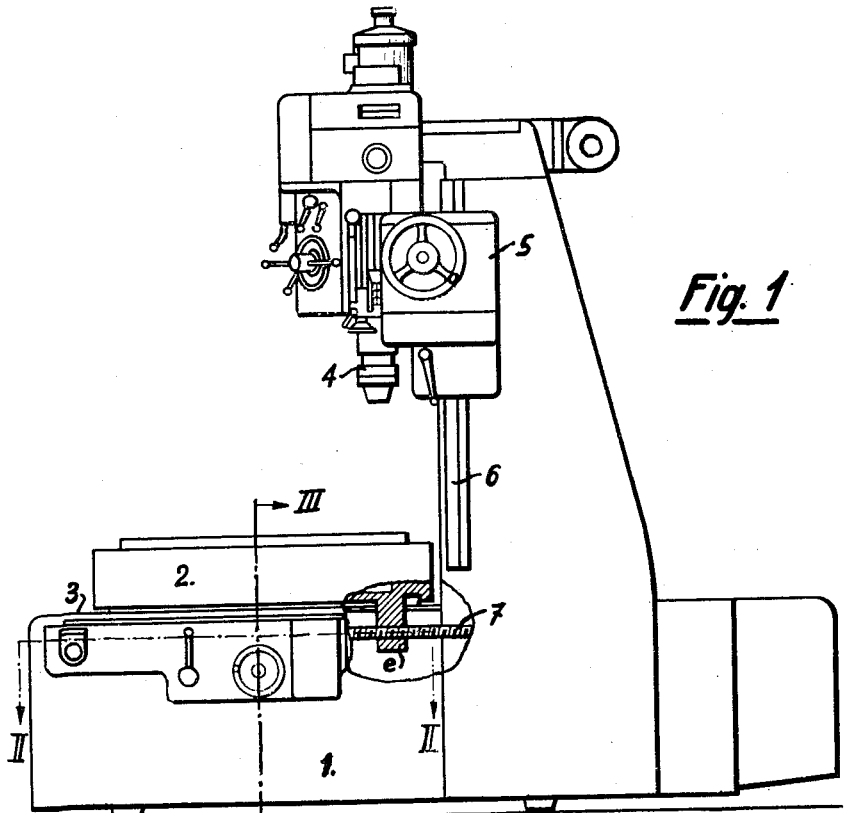
Figure 2:
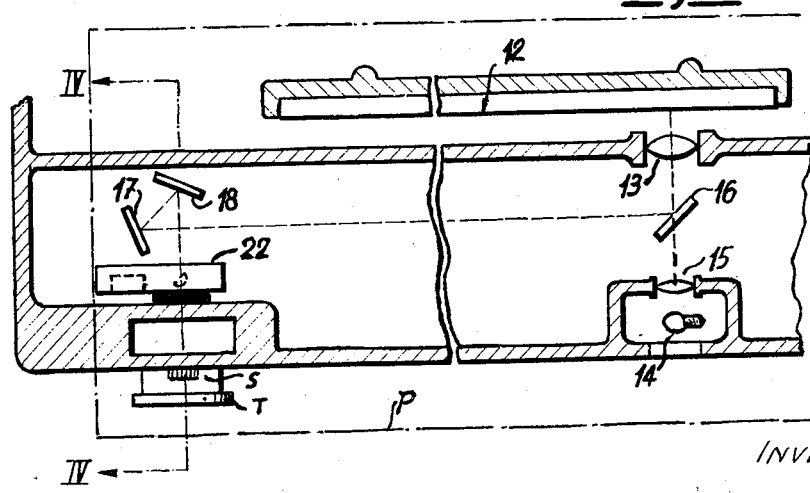
Figure 9:
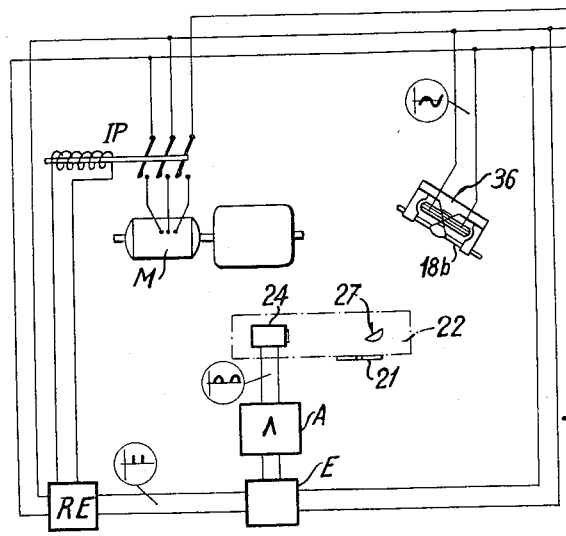
Figure 8:
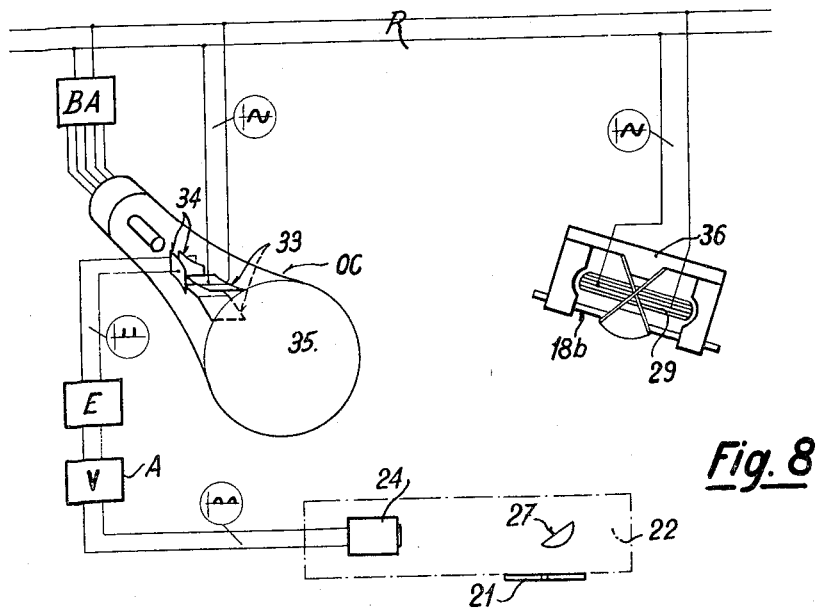

FIG. 1 is a side view of the jig boring machine.
FIG. 2 is a cross-section and at a larger scale along line II—II of FIG. 1.
FIG. 3 is a partial cross-section along line III—III of FIG. 1.
FIG. 4 is a cross-section of a detail at larger scale along line IV—IV of FIG. 2.
FIG. 5 is a partial perspective view of the optical locating device.
FIG. 6 is a partial perspective view of the photo-electric locating device.
FIG. 7 is a plan view of the sweeping device.
FIG. 8 shows the electric diagram of the photo-electric locating device.
FIG. 9 shows the electric diagram of an automatic stopping device controlled by the photo-electric locating device.

The illustrated jig boring machine comprises a bed 1, a work-piece table 2 adapted to slide with respect to the bed along guide-way 3 and a vertical tool-holder spindle 4 so mounted that it can slide along a horizontal cross-rail 5 which is itself adapted to slide along lateral guide-ways 6. The table 2 carries a nut *e* engaged on a screw 7 rotating in bearings carried by the bed and carrying a toothed wheel 8 mechanically connected with a shaft 9 by a gear 10 and a worm 11. Said shaft 9 is connected, on the one hand, by the intermediary of a speed reducer V with a motor M and, on the other hand, by the intermediary of a coupling A with a manual actuating member O. A spring *r* tends to maintain out of engagement the two parts of the coupling A.

The illustrated jig boring machine is provided with a visual device for locating the position of the table 2. Said device comprises, on the one hand, a precision measuring member constituted, in the illustrated example, by a graduated scale 12 carried by the table 2, and, on the other hand, a projecting device P of the lines of said scale. Said projecting device comprises a light source 14 lighting the scale 12 by the intermediary of a condenser 15, of a semi-transparent mirror 16 and of an objective 13. The light beam reflected by the scale 12 is returned by the mirror 16 and mirrors 17 and 18 onto an observation screen 19. The image of the line of the scale 12 projected onto said screen 19 is observed by means of a mirror 20. A glass member 20a is mounted over mirror 20 for protective purposes.

A carriage 22 sliding along a guide 23 carries a mark 21, also visible on the observation screen. The displacements of said carriage 22 are controlled by a graduated drum T. The division of the drum T travels opposite a vernier S. The position of the table 2 is determined by the registering of the mark 21 with the image of a line of the scale projected onto the observation screen 19.

The photo-electric locating device comprises a photo-electric cell 24 carried by the carriage 22 and disposed behind an opaque screen 25 provided with a slit 26. One portion of the beam of rays reflected by the mirror 17 is projected onto said opaque screen 25. To this effect, a mirror 18b disposed in the plane of the mirror 18 is carried by the movable part of an electrodynamic motor 36 represented more in detail by FIG. 7. Said mirror 18b, actuated in a regular oscillating movement by said motor 36, reflects one portion of the beam of rays onto the mirror 27 carried by the carriage 22 which reflects said beam of rays onto the opaque screen 25.

The electrodynamic motor 36 comprises a movable support 28 carrying the mirror 18b and on which is fixed a coil 29 disposed between the poles of a permanent magnet 30 having the general shape of a horse-shoe and rigidly fastened to the bed 1. The movable support 28 is elastically carried by said magnet 30 by means of two pairs of flexible blades 31 disposed crosswise and fixed, on the one hand, to both ends of said support, and, on the other hand, on a boss 32 of the magnet 30.

The slit 26 of the opaque screen 25 is so disposed with respect to the movable mark 21, that when the movable mirror is located in its median position, that is in the plane of the mirror 18, and the image of a line of the graduated scale 12 projected onto the observation screen registers with the mark 21, the mirror 27 reflects the second portion of the image of said same line of the scale 12 onto the slit 26.

The operation of said photo-electric locating device is as follows:

As in well-known observation and photo-electric locating devices, the displacement of the carriage 22 from a given position, called position of origin, in order to bring the mark 21 in coincidence with the image of a line of the scale, is obtained by actuating the graduated drum T. The amplitude of the angular displacement of said drum constitutes a measure of the fraction of division of the graduated scale 12 corresponding to the space between the image of the line on the observation screen and the position of origin of the mark 21.

The coil 29 placed in the magnetic field of the magnet 30 is fed by alternating current and oscillates with the frequency of said current. Said coil drives along into its movement the support 28 and consequently the movable portion 18b of the mirror 18. Said oscillating movement imparts to the portion of the image of the line reflected by the movable mirror 18b a regular to and fro movement, so that said image sweeps the opaque screen 25.

When the median position of the image of the line registers with the slit 26, the intervals of time between two successive passages of the image of the line before said slit are equal amongst themselves, so that the current emitted by the photo-electric cell 24 varies at regular intervals of time. On the other hand, as soon as said median position is situated on the left or on the right of the slit 26, the intervals of time between the variations of the current emitted by the photo-electric cell are no more equal, and the unequality of said intervals of time is the greater the wider is the space between the median position of the image and the slit. Said unequality constitutes thus a measure of the space between the mark 21 and the image of the line on the observation screen.

FIG. 8 illustrates an electronic device to render visible said unequality of the time intervals. Said device, known in itself, comprises a cathodic oscilloscope OC fed by a feeding block BA connected with a source R of alternating current. One of the pairs of deviation plates 33 of said oscilloscope is connected also to said source R of alternating current, as well as the coil 29 of the electrodynamic motor. The photo-electric cell 24 is connected with an electronic amplifier A which feeds an electronic appliance E of known type transforming the electric impulses of the cell 24 into instantaneous impulses or impulses of very short duration. Said instantaneous impulses are applied to the second pair of deviation plates 34 of the cathodic oscilloscope.

The luminous spot of said oscilloscope draws onto the fluorescent screen 35 of said oscilloscope a line perpendicular to its sweeping movement imparted by the deviation plates 33 and whose position with respect to a mark is a measure of the spacing of the position of the table 2 with respect to the desired position of the table. Such a reading device is described in detail in the British Patent No. 684,435.

This reading device performs a very accurate checking of the registering of the mark 21 with the image of the line of the scale 12 projected onto the observation screen 19. Said reading device enables the operator to verify said registering from his working place and at a distance.

In another embodiment, illustrated by FIG. 9, the signals emitted by the photo-electric cell 24 are utilized to control an automatic stopping of the movable member in a desired position.

The photo-electric cell 24 is connected with the amplifier A which feeds the electronic appliance E which is connected with an electronic relay RE of known type, responsive to the equality or the unequality of the implifier A which feeds the electronic appliance E which relay controls a switch IP connected in the current supply of the motor M and brings about the opening of said switch when the impulses follow one another at steady time intervals, that is, when the image of the line of the scale projected onto the observation screen registers with the mark 21.

I claim:

1. In a machine tool or measuring machine having a frame and a movable member displaceable with respect to said frame, a visual and photoelectric device for locating the position of said movable member comprising a precision-graduated scale mounted on said movable member and a projection device for projecting the image of a line of said graduated scale, an observation screen onto which a part of said image of said line is projected, a carriage, an adjustable mark displaceable in front of said observation screen, an opaque screen onto which the other part of said image is projected, said carriage carrying said mark and said opaque screen, a slit disposed in said opaque screen, a photoelectric cell located behind said slit, mirrors for reflecting the image of said line onto said observation screen and said slit in said opaque screen, one of said mirrors formed of two separate portions, one of said portions mechanically connected to the frame of said machine and projecting onto the observation screen said part of the image of said line of said scale and the second portion of said mirror being movable and driven in a regular oscillatory movement and projecting onto said opaque screen the other part of said image of said line of said scale, whereby a sweeping movement is imparted to said other part of said image so that when said image part projected onto said observation screen registers with said mark, the sweeping movement of the other part of said image is centered onto said slit disposed in said opaque screen.

2. In a machine tool or measuring machine as claimed in claim 1 wherein said photoelectric cell is carried by said carriage carrying said mark and said opaque screen, means to control said carriage whereby the setting of said mark in coincidence with the image of said line of said scale projected onto said observation screen allows measuring of the fractions of said scale.

3. In a machine-tool or measuring machine as claimed in claim 1 and further comprising an electrodynamic motor the movable part of which carries said second portion of said mirror, crosswise disposed elastic blades connected to the fixed part of said motor and carrying said movable part of said motor.

No references cited.